United States Patent [19]

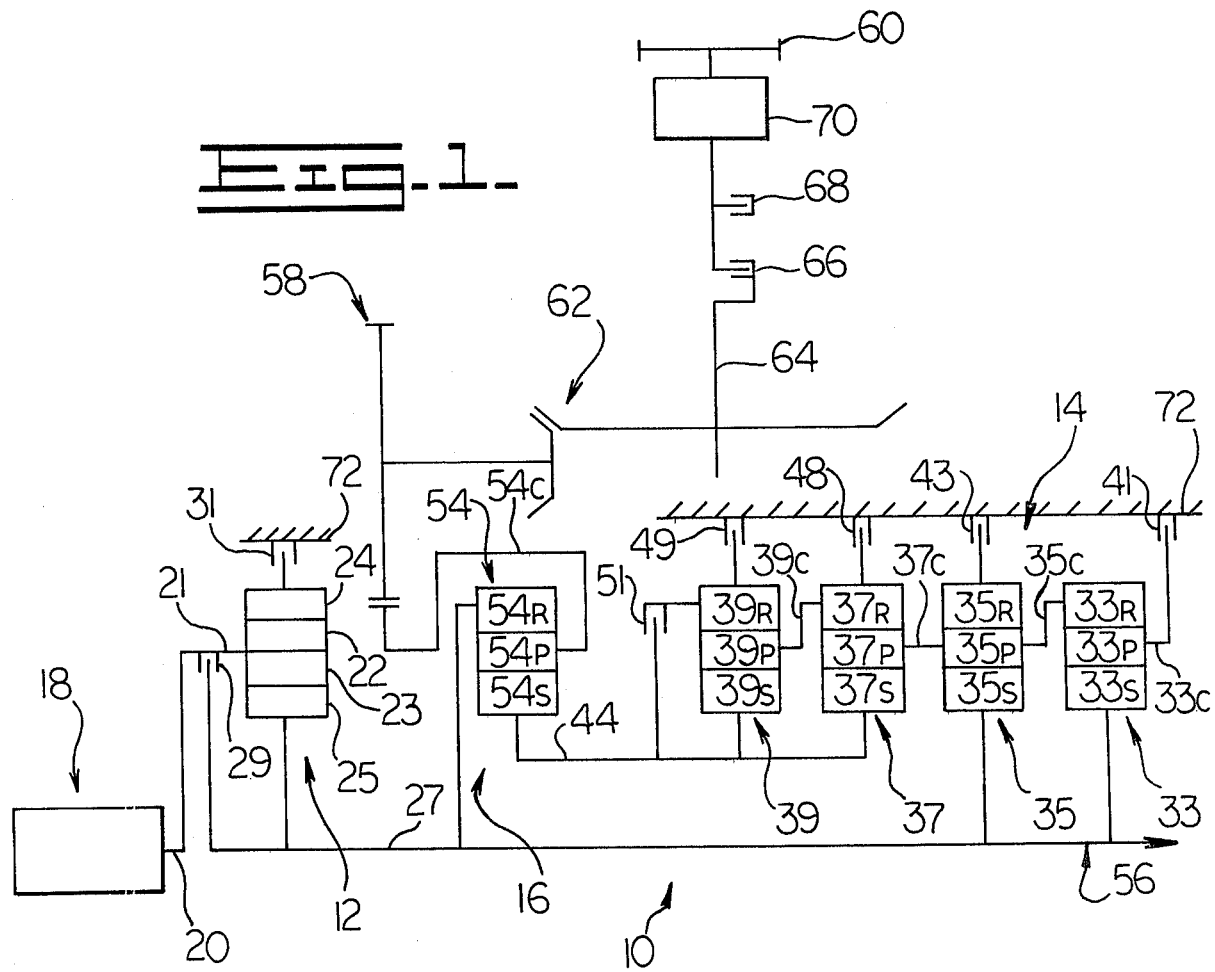

Johnson et al.

[11] 4,088,043
[45] May 9, 1978

[54] DIRECT DRIVE TRANSMISSION

[75] Inventors: Lowell E. Johnson, East Peoria; Gerald B. Ireland, Morton; Marvin L. Schneider, Peoria, all of Ill.

[73] Assignee: Caterpillar Tractor Co., Peoria, Ill.

[21] Appl. No.: 654,430

[22] Filed: Feb. 2, 1976

[51] Int. Cl.² .................... F16H 3/44; F16H 37/06; F16H 37/08; F16H 57/10

[52] U.S. Cl. ........................................ 74/681; 74/765; 74/705; 74/687; 74/740

[58] Field of Search ................ 74/753, 764, 765, 740, 74/785, 789, 810, 812, 660, 674, 681, 682, 694, 695, 705

[56] References Cited

U.S. PATENT DOCUMENTS

| | | | |
|---|---|---|---|
| 3,347,113 | 10/1967 | Ramsel | 74/769 X |
| 3,815,445 | 6/1974 | Gorrell et al. | 74/764 X |
| 3,913,415 | 10/1975 | Herr | 74/740 X |

FOREIGN PATENT DOCUMENTS

| | | | |
|---|---|---|---|
| 929,333 | 6/1963 | United Kingdom | 74/764 |

Primary Examiner—Samuel Scott
Assistant Examiner—Don E. Ferrell
Attorney, Agent, or Firm—Phillips, Moore, Weissenberger, Lempio & Majestic

[57] ABSTRACT

A multi-speed transmission for an engine driven agricultural or construction vehicle is comprised of an epicyclic torque-splitting gear arrangement driven by an input assembly. The input assembly, driven by the engine through a drive engagement means, includes a reversing planetary gear arrangement. The epicyclic torque-splitting gear arrangement includes an input member driven by the input assembly, an output member and a reaction member. The reaction member of the epicyclic torque-splitting gear arrangement is drivingly interconnected with a speed reduction means. The speed reduction means is also driven by the input assembly, and is selectively controllable for rotating the reaction member of the epicyclic torque-splitting gear arrangement in one or the other directions relative to the direction of rotation of the input assembly. The speed reduction means is further controllable to stop rotation of the reaction member relative to rotation of the input assembly.

12 Claims, 2 Drawing Figures

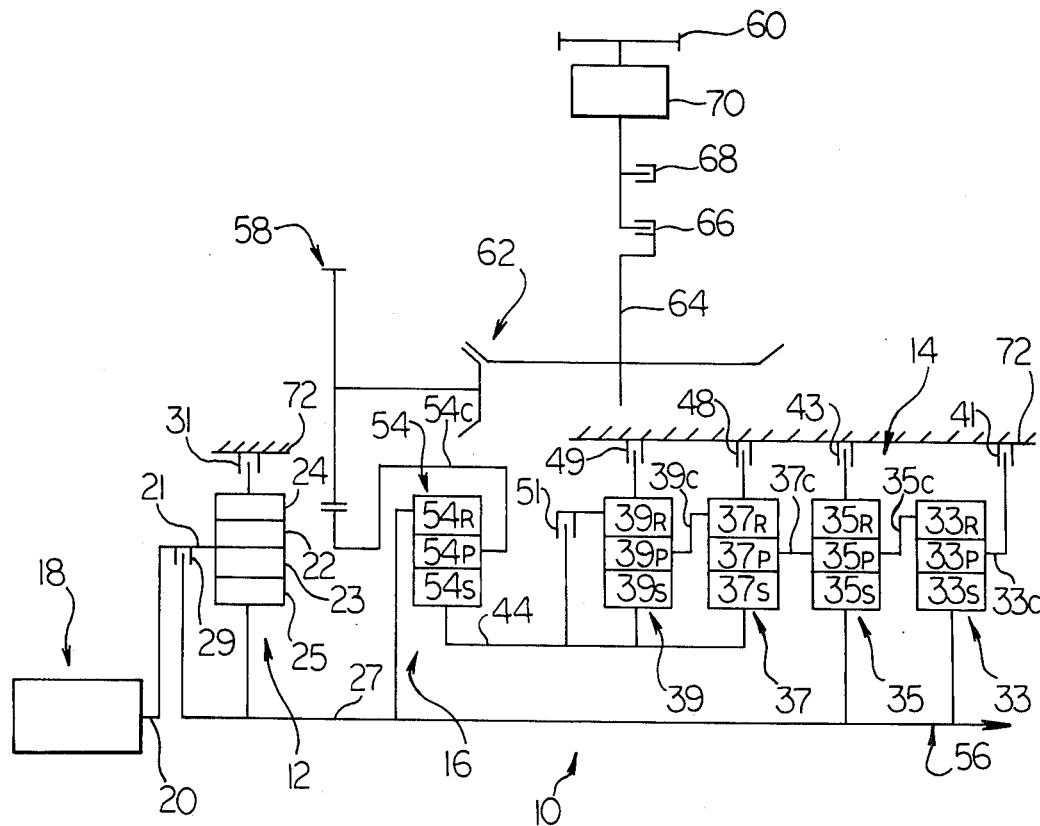

DIRECT DRIVE TRANSMISSION

BACKGROUND OF THE INVENTION

Multi speed transmissions for heavy vehicles of the type used in agricultural and constructional applications have varied widely in design. Frequently, a torque divider is incorporated in such transmissions to provide a multiple power path thus to decrease overall weight and size requirements and to overcome some of the inefficiencies found in direct drive transmissions. A torque divider normally narrows the operating range of a conventional transmission, therefore coupling a torque divider with such a transmission can provide more efficient operation over a desired narrow operating range which may be required in agricultural or construction use. Combining a torque divider with a conventional transmission to accomplish an efficient multiple drive path through a transmission is the primary purpose of this invention.

Accordingly, this invention couples an epicyclic type torque divider, having an input member, an output member and a reaction member to a multi-speed bi-directional range section. In particular, the input member of the epicyclic torque divider is coupled with the input member of the multi-speed bi-directional range section while the reaction member of the epicyclic torque divider is coupled with the output member of the range section. Thus, output from the range section is provided at the output member of the epicyclic torque divider. This invention also incorporates a reversing planetary system, drivingly located between the engine and the torque divider system. Several unique features will result from this arrangement. First, the reduction ratio of the transmission may be simply changed by varying the size of the input, output and reaction members of the epicyclic torque divider, rather than a complete redesign of the range section to which it is coupled. This unique feature enables a single design for the transmission to cover a wide range of vehicles such as may be encountered in agricultural or construction type work. A second unique feature of this transmission is the positioning of the forward-reverse section, thereby providing a complete range of forward and reverse speeds through all mathematically possible gear ratios. This positioning of the forward-reverse planetary arrangement also provides a possible forward and reverse capability in a power takeoff shaft, the direction of rotation of which will follow the direction of rotation of the output shaft of the transmission.

SUMMARY OF THE INVENTION

It is an object of this invention to provide a multi-speed transmission readily adaptable for either agricultural or construction vehicles.

It is a further object of this invention to provide a transmission having closely spaced mechanical drive gear ratios.

It is still another object of this invention to provide a multi-speed transmission which utilizes a torque divider to provide a multiple power path through the transmission.

It is still a further object of this invention to provide a multiple speed transmission which includes a forward and reverse planetary gear arrangement preceding the reduction section of the transmission.

It is an additional object of this invention to provide a power takeoff from this transmission, the direction of rotation of the power takeoff being reversible by the transmission forward and reverse section.

Briefly stated, this invention is a multi-speed transmission for an engine driven vehicle. The transmission is built around an epicyclic torque-splitting gear arrangement, having an input member driven by the vehicle engine, an output member and a reaction member. The reaction member of the epicyclic torque-splitting gear arrangement is drivingly connected to a speed reduction means, the speed reduction means also being driven by the vehicle engine and selectively controllable for rotating the reaction member in one direction, stopping the rotation of the reaction member or rotating the reaction member in the other opposite direction, relative to the direction of rotation of the input member of the epicyclic torque-splitting gear arrangement.

The aforementioned objects, along with others not specifically enumerated, will become apparent from a study of the following specification and accompanying drawings.

BRIEF DESCRIPTION OF THE DRAWINGS

FIG. 1 illustrates a schematic diagram of the transmission herein described.

FIG. 2 is a tabular listing of the various clutch arrangements which may be engaged in operating the transmission herein described.

DETAILED DESCRIPTION OF THE PREFERRED EMBODIMENT

A schematic diagram of a vehicle transmission is shown in FIG. 1, which is adapted particularly for use in a tracked vehicle. It is to be understood that the transmission disclosed herein is equally applicable to a wheeled vehicle, wherein the drive train from the transmission to the traction members is modified accordingly.

The vehicle transmission 10, which is the subject of this invention, includes a planetary forward-reverse section 12, a speed reduction range section 14, and a torque dividing section 16. Transmission 10 is driven by the vehicle engine 18 through a shaft 20, which drives a planet carrier 21 of forward-reverse planetary section 12. A rotating clutch housing and planet carrier 21 has rotatably mounted thereon a plurality of planet gears 22 and a plurality of intermediate idler gears 23. A ring gear 24, and a sun gear 25, constitute the remaining elements of forward-reverse planetary section 12. Sun gear 25 is drivingly mounted on a shaft 27, which interconnects and constitutes an input shaft between forward-reverse planetary section 12 and range section 14 and torque dividing section 16. A drive engagement means such as clutch 29 is provided to interconnect engine driven shaft 20 with input shaft 27. Engagement of clutch 29 insures that engine driven shaft 20 and input shaft 27 rotate in the same direction. A brake 31 is provided to stop rotation of ring gear 24. Engagement of brake 31 to stop rotation of ring gear 24. Engagement of brake 31 to stop rotation of ring gear 24 will cause input shaft 27 to rotate in a direction opposite from that of shaft 20. Thus, forward and reverse planetary section 12, which is positioned ahead of range section 14 and torque dividing section 16, provides input to range section 14 and torque dividing section 16 in both the forward and reverse directions.

In the preferred embodiment, input shaft 27 provides input to speed reduction means, such as range section 14, at one of two planetary gear arrangements, either first planetary gear arrangement 33 or second lanetary gear arrangement 35, and in addition provides input to an epicyclic torque-splitting gear arrangement, such as torque dividing section 16. Range section 14 also includes a third planetary gear arrangement 37 and a fourth planetary gear arrangement 39. It will become apparent in the discussion that the first through the fourth planetary gear arrangements of range section 14 could constitute an ordinary planetary gear reduction system. By the introduction of torque dividing section 16 driven by forward-reverse planetary section 12 and range section 14, with the output of the third and fourth planetary gear arrangements also drivingly connected with the torque dividing section 16, a novel type of transmission is disclosed.

Referring particularly to range section 14, first planetary gear arrangement 33 comprises a sun gear 33s, drivingly mounted on shaft 27. Also included in the first planetary gear arrangement 33 is a planet carrier 33c, which has rotatingly mounted thereon a plurality of planet gears, 33p, and in intermeshing relationship with the plurality of planet gears 33p is a ring gear 33r, the plurality of planet gears 33p also intermesh with sun gear 33s. Planet carrier 33c is provided with a brake means 41, which may be selectively activated to stop rotation of planet carrier 33c. Engagement of brake means 41 causes ring gear 33r to rotate in a direction opposite than the direction of rotation of shaft 27. Ring gear 33r is drivingly connected with a planet carrier 35c of a second planetary gear arrangement 35. Second planetary gear arrangement 35 includes a sun gear 35s, also drivingly mounted on shaft 27, a plurality of planet gears 35p rotatingly mounted on planet carrier 35c, and a ring gear 35r. The plurality of planet gears 35p are in intermeshing relationship with sun gear 35s and also ring gear 35r. A brake means 43 is provided to selectively stop rotation of ring gear 35r. Selective stopping of ring gear 35r will rotate a planet carrier 37c of a third planet gear arrangement 37 in the same direction as shaft 27. It should be remembered that selective stopping of first planet gear carrier 33c by actuation of brake 41 rotates carrier 35c and thus carrier 37c in the direction opposite that of shaft 27.

The third planet gear arrangement 37 and fourth planet gear arrangement 39 each have sun gears 37s and 39s respectively driven by shaft means which may be a shaft 44 co-axially mounted about shaft 27. Third planetary gear arrangement 37, which includes the aforementioned sun gear 37s and planet carrier 37c, also includes a plurality of planet gears 37p rotatingly mounted on planet carrier 37c, and further includes a ring gear 37r. The plurality of planet gears 37p are in intermeshing relationship with sun gear 37s and ring gear 37r. A brake means 48 is provided to selectively stop rotation of ring gear 37r. Third planetary gear arrangement 37, as stated above, is drivingly interconnected with second planetary gear arrangement 35 through planet carrier 37c. Planet carrier 37c has rotatingly mounted thereon the plurality of planet gears 37p, and is integrally formed with planet carrier 35c which, it will be remembered, rotates with ring gear 33r.

The fourth planetary gear arrangement 39 includes sun gear 39s as noted above, a plurality of planet gears 39p and a ring gear 39r. The plurality of planet gears 39p, which are in intermeshing relationship with both sun gear 39s and ring gear 39r, are rotatingly mounted on a planet carrier 39c. The planet carrier 39c is drivingly interconnected with ring gear 37r of third planetary gear arrangement 37. A brake means 49 is provided for fourth planetary gear arrangement 39 to selectively stop rotation of ring gear 39r. In addition to brake means 49, a drive engagement means 51, which may be in the form of a rotating clutch, is provided to interconnect ring gear 39r with shaft 44.

The torque dividing section 16 includes a planetary gear arrangement 54, the ring gear 54r of which is driven by input shaft 27. Sun gear 54s is drivingly mounted on shaft 44 which, as noted above, may be co-axially mounted about input shaft 27. A plurality of planet gears 54p are included in planetary gear arrangement 54 and are mounted on a planet carrier 54c through which output torque is delivered.

Input shaft 27, which is driven by forward-reverse planetary section 12, and in turn drive range section 14 and torque dividing section 16, may be provided with a power takeoff, such as spline 56, to operate various acessories with rotational direction determined by forward-reverse planetary section 12.

Planetary carrier 54c, which is the output member of this transmission, may be interconnected to a series of transfer gears represented in FIG. 1 by a transfer gear 58. In FIG. 1, transfer gear 58 is adapted for driving a track-type vehicle through a pair of drive sprockets 60 one of which is shown. It should be understood that this type of drive is representative only; transfer gear 58 may instead be adapted to drive a wheeled vehicle through appropriate shafting. However, in this particular arrangement, transfer gear 58 drives a pair of bevel gears 62, each of which drive a cross shaft 64. Each cross shaft 64 is provided with a steering clutch 66 to engage cross shaft 64 with drive sprocket 60. A brake 68 is included to control rotation of cross shaft 64. A final reduction section 70 may be included with drive sprocket 60.

Operation of the transmission hereinbefore described involves the engagement of either brake 31 or clutch 29 to provide torque to input shaft 27. Torque provided to input shaft 27, as noted above, is split between the torque dividing section 16, with torque provided to ring gear 54r, and also to either sun gear 33s or sun gear 35s of range section 14, depending upon whether brake 41 or brake 43, is actuated. In addition to actuation of either brake 41 or brake 43, one of the drive engagement means associated with third planetary gear arrangement 37 or fourth planetary gear arrangement 39 must also be actuated. Actuation of brake 49 and drive engagement means 51 simultaneously, with neither brake 41 nor brake 43 actuated, stops rotation of sun gear 54s and results in direct mechanical drive through planetary gear arrangement 54.

Sizing of the individual gear elements in the various planetary gear arrangements will, of course, determine the sequenching of clutching and braking in order to accomplish the necessary reduction ratios of the transmission. A representative sequence of clutching and braking is illustrated in FIG. 2, which has been found to be particularly appropriate to certain sizing and arrangement of the various planetary gear elements. It should be noted that sun gear 54s is stopped in the middle range; that is, the fourth range of the suggested gearing, resulting in a direct mechanical drive. In the first three ranges, brake 41 of the first planetary gear arrangement is actuated, thus shaft 44 rotates in a direction opposite that of input shaft 27 at relatively slower speeds respectively. With shaft 44 and, consequently, sun gear 54s rotating in one direction relative to ring gear 54r, there is a regeneration of torque through the range section 14 via sun gear 33s. In gear ratios 5 through 7, while brake 43 is actuated in lieu of brake 41, sun gear 54s and shaft 44 rotate in the same direction as input shaft 27 and ring gear 54r at a relatively faster speeds respectively. This causes a mechanical split of torque, with a portion of the input torque being delivered directly to ring gear 54r from input shaft 27, and the remaining torque delivered to sun gear 54s via sun gear 34s and the third and fourth planetary gear arrangements 37 and 39, respectively.

Operation in the reverse mode entails the engagement of the remaining drive engagement devices remains the same. A neutral or zero torque output may be accomplished by engagement of clutch 29 with dissipation of torque in the range section resulting when brake 48 only is engaged.

A unique feature of this transmission is provided in the location of torque dividing section 16. Positioning of torque dividing section 16, between the input and the output section, permits simple and economical ratio changes in the transmission. All that is required to change the overall transmission ratio and, thus, the application of the particular vehicle, is to change the gear ratio in torque dividing section 16. Thus, a construction vehicle which is provided with one set of gear ratios to do a particular job may be readily adapted to another job requiring a different set of gear ratios, by the simple expedient of changing the gearing in the torque dividing section.

Speed reduction range section 14, which has been described in the preferred embodiment in terms of a four unit planetary transmission, may include additional planetary arrangements to obtain more speed ratios, or the entire range section may instead be a conventional counter shaft transmission with sliding shift collars for speed changes. Finally, a hydrostatic pump/motor may be substituted to provide infinite speed ranges. Any of these possible embodiments are considered within the scope of this invention.

Although this invention has been described with a certain degree of particularity related to a tracked vehicle, it should be noted that other applications of this transmission are well within the description set forth hereinbefore and in the appended claims.

What is claimed is:

1. A multi-speed transmission for an engine driven vehicle comprising:
    an input shaft;
    forward-revrse drive means drivingly operable by the vehicle engine for rotaing said input shaft in one or the other directions;
    an epicyclic torque-splitting gear arrangement having an input member driven by the input shaft, an output member, and a reaction member;
    speed reduction means also driven by said input shaft and selectively controllable for (i) rotating said reaction member in the same one direction relative to the direction of rotation of said input shaft, (ii) stopping rotation of said reaction member, or (iii) rotating said reaction member in the other opposite direction relative to the direction of rotation of said input shaft.

2. The multi-speed transmission as set forth in claim 1, wherein the forward-reverse means comprises an engine driven shaft and a forward and reverse planetary assembly said assembly, including a forward-reverse sun gear drivingly mounted on the input shaft, a planet carrier drivingly interconnected with said engine driven shaft, a plurality of planet gears rotatingly mounted on said planet carrier, a plurality of intermediate idler gears also rotatingly mounted on said planet carrier, said intermediate idler gears in intermeshing relationship with said forward-reverse sun gear and said planet gears, a forward-reverse ring gear intermeshing with said planet gears, reverse brake means selectively operable for stopping rotation of said forward-reverse ring gear; and forward drive engagement means selectively operable for drivingly interconnecting said engine driven shaft with said input shaft.

3. The multi-speed transmission set forth in claim 2, wherein the speed reduction means comprises:
    a first planetary gear assembly, including a first sun gear drivingly mounted on the input shaft, a first planet carrier, a plurality of first planet gears rotatingly mounted on said first planet carrier, a first ring gear, the plurality of first planet gears in intermeshing relationship with the first sun gear and the first ring gear and a first brake means actuable for selectively stopping rotation of said first planet carrier;
    a second planetary gear assembly, including a second sun gear drivingly mounted on said input shaft, a second planet carrier drivingly interconnected with said first ring gear, a plurality of second planet gears rotatingly mounted on said second planet carrier, a second ring gear, the plurality of second planet gears in intermeshing relationship with the second sun gear and the second ring gear, and a second brake means actuable for selectively stopping rotation of the second ring gear;
    a third planetary gear assembly having a third sun gear, a third planet carrier drivingly connected to said second planet carrier, a plurality of third planet gears, a third ring gear, the plurality of third planet gears in intermeshing relationship with the third sun gear and the third ring gear, and a third brake means for selectively stopping rotation of the third ring gear;
    a fourth planet gear assembly having a fourth sun gear, a fourth planet carrier drivingly interconnected with said third ring gear, a plurality of fourth planet gears rotatingly mounted on said fourth planet carrier, a fourth ring gear, the fourth planet gears in intermeshing relationship with the fourth sun gear and the fourth ring gear, and a fourth brake means for selectively stopping rotation of the fourth ring gear;
    shaft means for interconnecting said third sun gear, said fourth sun gear and the reaction member of the epicyclic torque-splitting gear arrangement; and
    drive engagement means for selectively interconnecting said fourth ring gear with said shaft means.

4. The multi-speed transmission as set forth in claim 3, wherein the input member of the epicyclic torque-splitting gear arrangement comprises a ring gear drivingly interconnected with the input shaft, and further, wherein the reacton member of said epicyclic torque-splitting gear arrangement comprises a sun gear drivingly interconnected with said shaft means, and further, wherein the output member of said epicyclic torque-splitting gear arrangement comprises a planet carrier and a plurality of planet gears rotatingly mounted on said planet carrier, said planet gears in intermeshing relationship with said sun gear and said ring gear.

5. The multi-speed transmission as set forth in claim 4, wherein said shaft means comprises a co-axial shaft member mounted about said input shaft between the epicyclic torque-splitting gear arrangement and the second planetary gear assembly.

6. A multi-speed transmission for an engine driven vehicle comprising:
- a shaft driven by the vehicle engine;
- an input shaft;
- drive engagement means operable for drivingly connecting said engine driven shaft with said input shaft for selectively rotating said input shaft in one or the other directions relative to said engine driven shaft;
- a torque-dividing planetary gear assembly having a ring gear driven by said input shaft, a sun gear member, and an output assembly including a planet carrier and a plurality of planet gears rotatingly mounted thereon and intermeshing with the ring gear and the sun gear; and
- speed reduction means driven by said input shaft and selectively operable for rotating said sun gear of the torque dividing planetary gear assembly in one or the other directions relative to said input shaft.

7. The multi-speed transmission as set forth in claim 6, wherein said speed reduction means comprises a first planetary gear assembly having a first sun gear driven by the input shaft, a first ring gear, a first planet carrier having a plurality of planet gears rotatingly mounted thereon;
- first brake means selectively operable to stop rotation of said first planet carrier so that said first ring gear will rotate in a direction opposite that of said first sun gear;
- a second planetary gear arrangement having a second sun gear driven by said input shaft, a second ring gear, a second planet carrier interconnected with the ring gear of the first planetary gear arrangement, and second brake means for selectively stopping rotation of the second ring gear so that the second planet carrier rotates in the same direction as said input shaft;
- a third planetary gear assembly including a sun gear, a third ring gear, a third planet carrier, and a plurality of planet gears rotatingly mounted on the third planet carrier, the planet carrier drivingly interconnected with the planet carrier of said second planetary gear assembly, and a third brake means selectively operable for stopping rotation of the third ring member;
- a fourth planetary gear assembly including a fourth sun gear, a fourth ring gear, a fourth planet carrier, and a plurality of planet gears rotatingly mounted on the fourth planet carrier, the fourth planet carrier drivingly connected to ring gear of the third planetary gear assembly, and a fourth brake means selectively operable to stop rotation of the fourth ring gear;
- a shaft means interconnecting the sun gears of the third and fourth planetary gear assemblies with the sun gear of the torque dividing planetary gear assembly; and
- a drive engagement means for interconnecting the ring gear of the fourth planetary gear assembly with said shaft means.

8. The multi-speed transmission as set forth in claim 7, wherein the drive engagement means operable for drivingly connecting the engine driven shaft with the input shaft comprises a forward-reverse planetary gear assembly including a sun gear drivingly mounted on said input shaft, a planet carrier driven by the engine driven shaft, a plurality of planet gears rotatingly mounted on said planet carrier, a plurality of intermediate idler gears rotatingly mounted on said planet carrier, and a ring gear, said plurality of intermediate idler gears intermeshing with said sun gear and said plurality of planet gears said plurality of planet gears intermeshing with said ring gear;
- brake means selectively operable for stopping rotation of said ring gear; and
- clutch means selectively operable for interconnecting said engine driven shaft with said input shaft.

9. A vehicle transmission comprising:
- an input shaft rotatable in a first and second direction;
- a planetary gear arrangement including a ring gear driven by the input shaft, an output assembly including a planet carrier and a plurality of planet gears rotatingly mounted on said planet carrier, and a sun gear, the plurality of planet gears in intermeshing relationship with the ring gear and the sun gear;
- speed change means driven by said input shaft and selectively operable for driving said sun gear relative to said input shaft in the same or in the opposite direction of rotation and further selectively operable for stopping rotation of said sun gear relative to said input shaft.

10. The vehicle transmission set forth in claim 9, wherein said speed-change means is further selectively operable for driving said sun gear in the same relative direction as said input shaft at a first forward speed of rotation and a second forward speed of rotation, said first forward speed of rotation being relatively faster than said second forward speed of rotation, and further selectively operable to rotate said sun gear in an opposite direction relative to said input shaft at a first reverse speed relative to said input shaft and a second reverse speed relative to said input shaft, said first reverse speed being relatively slower than said second reverse speed.

11. A vehicle transmission comprising:
- an input assembly;
- a torque dividing planetary gear arrangement including a torque dividing ring gear driven by the input assembly, a torque dividing planet carrier, a plurality of torque dividing planet gears rotatably mounted on said torque dividing planet carrier, and a torque dividing sun gear, said torque dividing planet gears in intermeshing relationship with the torque dividing ring gear and the torque dividing sun gear;
- an output member driven by the torque dividing planet carrier;
- a first planetary gear arrangement including a first sun gear driven by said input assembly, a first planet carrier, a plurality of first planet gears mounted on said first planet carrier and intermeshing with the first sun gear, a first ring gear in intermeshing relationship with said plurality of first planet gears, and first brake means for selectively stopping rotation of said first planet carrier;
- a second planetary gear arrangement including a second sun gear driven by said input assembly, a second planet carrier drivingly interconnected with said first ring gear, a plurality of second planet gears rotatingly mounted on said second planet carrier and intermeshing with said second sun gear, a second ring gear intermeshing with said second planet gears, and a second brake means for selectively stopping rotation of said second ring gear;

a third planetary gear arrangement including a third sun gear, a third planet carrier drivingly connected with the second planet carrier, a plurality of third planet gears intermeshing with the third sun gear and rotatingly mounted on the third planet carrier, a third ring gear intermeshing with the plurality of third planet gears, and a third brake means for selectively stopping rotation of the third ring gear;

a fourth planetary gear arrangement including a fourth sun gear, a fourth planet carrier drivingly connected with the third ring gear, a plurality of fourth planet gears rotatingly mounted on the fourth planet carrier and intermeshing with the fourth sun gear, a fourth ring gear intermeshing with the plurality of fourth planet gears, and a fourth brake means for selectively stopping rotation of the fourth ring gear;

an intermediate shaft means for drivingly interconnecting said torque divider sun gear, the third sun gear and the fourth sun gear; and first drive engagement means for drivingly interconnecting the fourth ring gear with the intermediate shaft means.

12. The transmission set forth in claim 11 further comprising an engine driven input shaft, and wherein the input assembly includes an input shaft and a forward-reverse planetary gear arrangement having a forward-reverse planet carrier driven by said engine driven input shaft, a forward-reverse ring gear, a forward-reverse sun gear drivingly mounted on said input shaft, a plurality of forward-reverse planet gears rotatingly mounted on the forward-reverse planet carrier and intermeshing with the forward-reverse ring gear, a plurality of intermediate idler gears, also rotatingly mounted on the forward-reverse planet carrier and intermeshing with the forward-reverse planet gears and the forward-reverse sun gear;

a forward-reverse ring gear brake for selectively stopping rotation of the forward-reverse ring gear; and drive engagement means for drivingly connecting the forward-reverse planet carrier with said input shaft;

said input shaft drivingly connected with the torque dividing ring gear, the first sun gear and the second sun gear.

* * * * *